(12) United States Patent
Buelow

(10) Patent No.: US 9,462,740 B2
(45) Date of Patent: Oct. 11, 2016

(54) LONG DISTANCE ELECTRONIC LOAD SENSE SIGNAL COMMUNICATION FOR IMPLEMENT CONTROL

(71) Applicant: CNH Industrial America LLC, New Holland, PA (US)

(72) Inventor: Jonathan L. Buelow, Houston, TX (US)

(73) Assignee: CNH Industrial America LLC, New Holland, PA (US)

( * ) Notice: Subject to any disclaimer, the term of this patent is extended or adjusted under 35 U.S.C. 154(b) by 181 days.

(21) Appl. No.: 14/309,265

(22) Filed: Jun. 19, 2014

(65) Prior Publication Data

US 2015/0366126 A1 Dec. 24, 2015

(51) Int. Cl.
*A01B 76/00* (2006.01)
*A01C 7/08* (2006.01)
*A01B 79/00* (2006.01)

(52) U.S. Cl.
CPC .............. *A01B 79/005* (2013.01); *A01B 76/00* (2013.01); *A01C 7/081* (2013.01)

(58) Field of Classification Search
CPC ....... A01B 79/05; A01B 79/00; A01B 76/00
See application file for complete search history.

(56) References Cited

U.S. PATENT DOCUMENTS

| | | | | |
|---|---|---|---|---|
| 4,550,747 A * | 11/1985 | Woodworth | ......... | G05D 7/0635 137/487.5 |
| 5,028,017 A * | 7/1991 | Simmons | .............. | B64F 5/0063 239/131 |
| 5,446,979 A | 9/1995 | Sugiyama et al. | | |
| 6,016,875 A | 1/2000 | Orbach et al. | | |
| 6,058,343 A | 5/2000 | Orbach et al. | | |
| 6,389,999 B1 | 5/2002 | Duello | | |
| 6,408,622 B1 | 6/2002 | Tsuruga et al. | | |
| 7,431,101 B2 | 10/2008 | Hacker | | |
| 7,938,074 B2 | 5/2011 | Liu | | |
| 8,230,771 B2 | 7/2012 | Bitter | | |
| 8,346,442 B2 | 1/2013 | Ryder et al. | | |
| 2011/0313575 A1 | 12/2011 | Kowalchuk et al. | | |
| 2013/0032362 A1 | 2/2013 | Rylander | | |
| 2013/0032363 A1 | 2/2013 | Curry et al. | | |
| 2013/0081830 A1 | 4/2013 | Tuttle et al. | | |
| 2013/0104785 A1 | 5/2013 | Achen et al. | | |
| 2013/0146318 A1 | 6/2013 | Bassett | | |
| 2013/0192186 A1 | 8/2013 | Bassett | | |

OTHER PUBLICATIONS

"Hydraulics, closed-center, pressure-and-flow compensated (pfc)—29 gpm", Deere & Company Sales Manual, 2012 (3 pages).
"Puma Series Tractors", CNH America LLC brochure, 2011 (28 pages).

* cited by examiner

*Primary Examiner* — Christopher J Novosad
(74) *Attorney, Agent, or Firm* — Rebecca L. Henkel

(57) ABSTRACT

An agricultural system including a tractor and an implement powered by the tractor. The implement having a plurality of hydraulic fluid using devices, at least one transducer, and a communications device. The transducer is configured to generate a signal representative of a hydraulic load requirement of the plurality of hydraulic fluid using devices. The communications device conveying the signal to the tractor. The tractor is configured to alter a hydraulic fluid characteristic supplied to the implement dependent upon the signal.

20 Claims, 3 Drawing Sheets

LONG DISTANCE ELECTRONIC LOAD SENSE SIGNAL COMMUNICATION FOR IMPLEMENT CONTROL

BACKGROUND OF THE INVENTION

1. Field of the Invention

The present invention generally relates to agricultural implements, and more particularly to hydraulic load sensing systems of agricultural implements.

2. Description of the Related Art

Farmers utilize a wide variety of implements, including seeding implements such as drills and planters. In a known type of planting implement, seed planting or row units are attached to a toolbar extending transverse to the direction of planting. The toolbar is coupled to a tractor or other work vehicle suitable for pulling the planting implement along a field that is to be seeded to a crop. Each planting unit includes a ground penetrating assembly that shapes the bottom and sides of the seed trench, and a seed metering device provides individual seeds at a controlled rate for deposit in the seed trench. Furrow closing components of each row unit close the seed trench in a controlled manner.

The planter typically will have at least one hydraulic motor to run a fan for the movement of seed and at least one hydraulic seed drive motor, each having a variable hydraulic fluid use. These and other hydraulic fluid using devices on the implement use pressurized hydraulic fluid supplied by the tractor pulling the implement. The tractor may have a hydraulic pump with a variable output capability. The current art includes using hydraulic lines or hoses to communicate the load requirements to a control on the planter. This poses some difficulty to effectively do as the implements have increased in size requiring longer and longer hydraulic lines that have inherent losses and response delays.

What is needed in the art is a more cost effective and quicker response load control system for implements.

SUMMARY OF THE INVENTION

The present invention provides an implement load sensing and control system for an agricultural implement, and more particularly a planter having transducers that electronically resolve the load requirements.

In one form thereof, the invention is directed to an agricultural system including a tractor and an implement powered by the tractor. The implement having a plurality of hydraulic fluid using devices, at least one transducer, and a communications means. The transducer is configured to generate a signal representative of a hydraulic load requirement of the plurality of hydraulic fluid using devices. The communications means convey the signal to the tractor. The tractor is configured to alter a hydraulic fluid characteristic supplied to the implement dependent upon the signal.

In another form, the invention is directed to an agricultural implement powered by a tractor. The implement includes a plurality of hydraulic fluid using devices, at least one transducer, and a communications means. The transducer is configured to generate a signal representative of a hydraulic load requirement of the plurality of hydraulic fluid using devices. The communications means conveys the signal to the tractor. The tractor is configured to alter a hydraulic fluid characteristic supplied to the implement dependent upon the signal.

An advantage of the present invention is that the hydraulic load is quickly resolved and conveyed to the tractor.

Another advantage of the present invention is that it eliminates long hydraulic lines used for load control.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
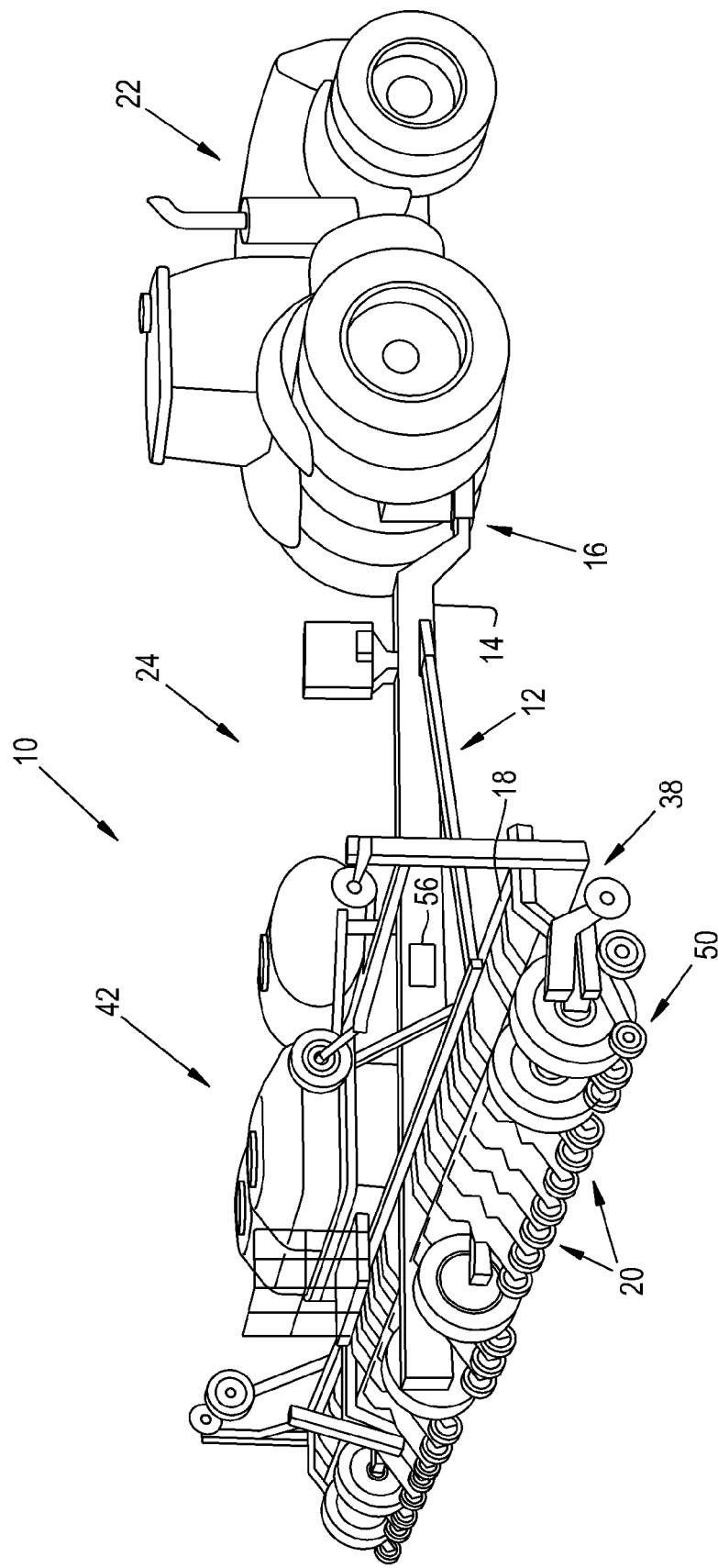
FIG. 1 is a perspective view of an agricultural seed planting implement.

Referring now to the drawings, and more specifically to FIG. 1 in particular, a seed planting implement 10 is shown. Seed planting implement 10 has a frame that includes a tow bar assembly 12 having a tow bar 14 and a connection assembly 16 at the longitudinally forward end thereof configured for mating with a corresponding hitch of a tractor or other work vehicle (not shown) for pulling seed planting implement 10 through a field. A laterally extending toolbar 18 is generally transverse to tow bar 14 and thereby generally transverse to the direction implement 10 is towed during planting operations. A plurality of seed planting units (or row units) 20 are connected to toolbar 18 in a side by side relationship, each of the seed planting units (row units) being substantially identical to the others. In the exemplary embodiment shown, seed planting implement 10 includes sixteen seed planting units 20, only some of which are identified with reference numbers; however, it should be understood that more or fewer seed planting units can be provided on a particular seed planting implement.

Each seed planting unit 20 is connected to toolbar 18 by upper and lower arms. Each seed planting unit 20 extends rearward from toolbar 18 to plant a row of seeds as seed planting implement 10 is towed across a field by tractor 22. The individual planting units 20 are spaced along toolbar 18 to provide planted seed rows of a desired spacing. During a planting operation, forward movement of seed planting implement 10 causes each seed planting unit 20 to form a seed trench, deposit equally spaced seeds in the seed trench and close the seed trench over the deposited seeds.

A seed metering system receives seeds from a seed hopper and provides individual seeds at a controlled rate to a seed tube for deposit in the bottom of the seed trench. Bulk tanks 42 contain seed and perhaps fertilizer or chemicals that are metered to, or proximate to, the seed trench. A vacuum system includes a fan/motor 40 that provides vacuum to a seed metering system for the operation of the seed metering system. A seed trench closing mechanism 50 at the trailing end of each seed planting unit 20 closes the seed trench after the seeds have been deposited in the seed trench. Seed trench closing mechanism 50 may include a pair of pinch wheels that operate on opposite sides of the seed trench to move soil back into the seed trench and over the seeds deposited in the bottom of the seed trench. A trailing press wheel travels along the top of the closed seed trench and firms the soil replaced in the seed trench.

Figure 2:
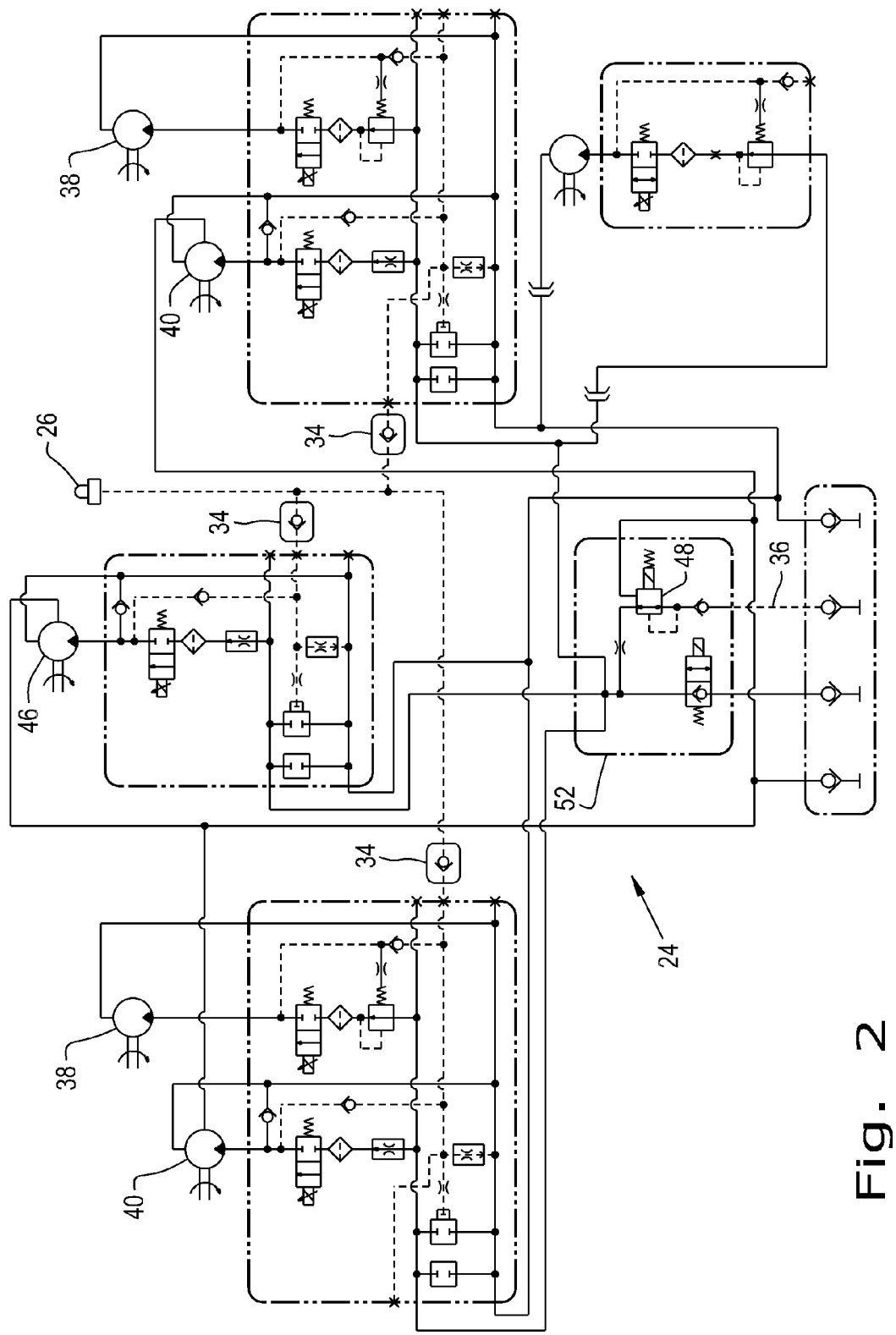
FIG. 2 is a schematic representation of a load sense system and other elements in one embodiment of the present invention used on the implement of FIG. 1.
Figure 3:
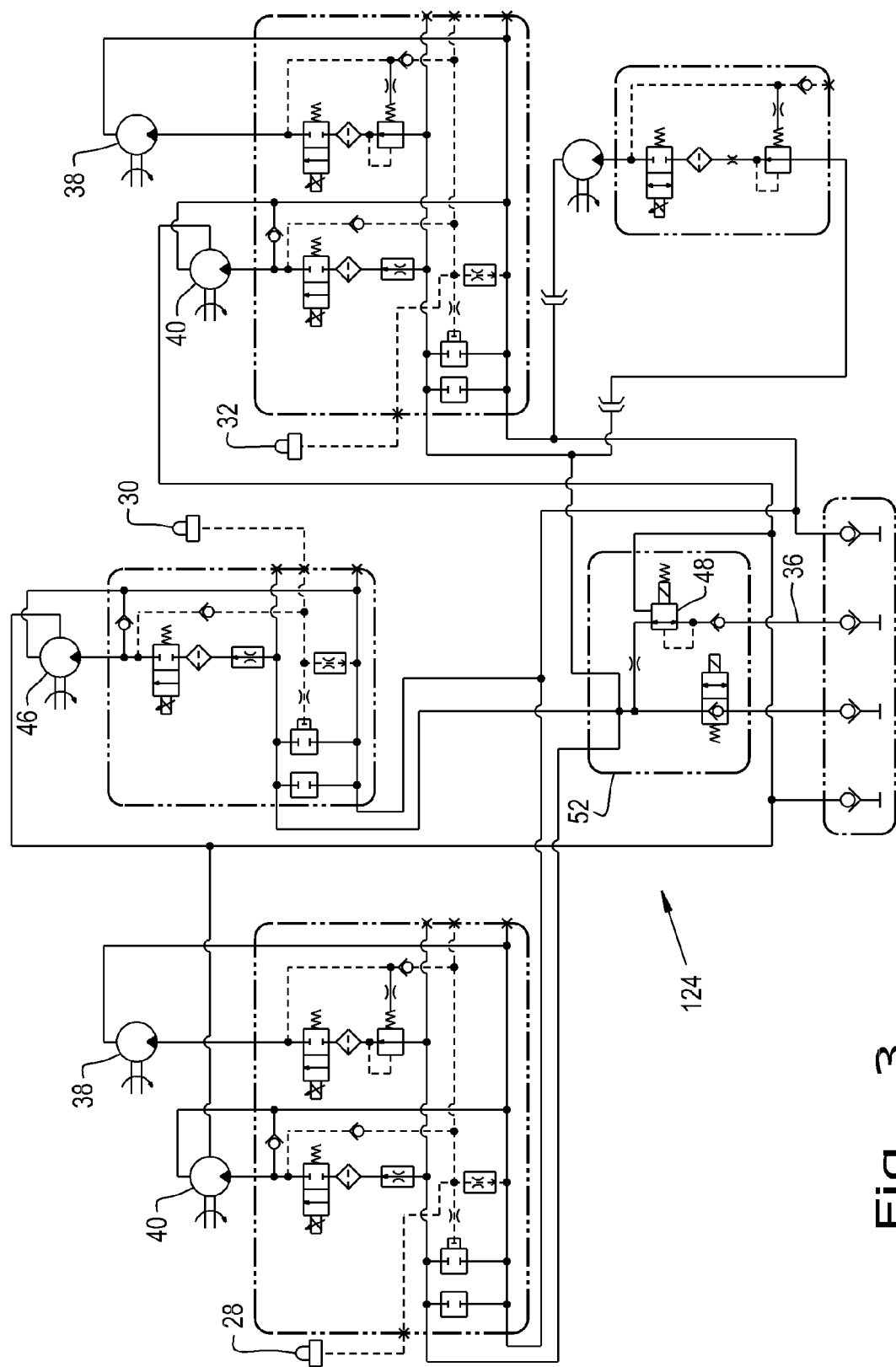
FIG. 3 is a schematic representation of a load sense system and other elements in another embodiment of the present invention used on the implement of FIG. 1.

Now, additionally referring to FIGS. 2 and 3 there are shown schematical representations of two hydraulic load sensing systems 24 and 124 that resolve the highest load requirement and conveys that information to tractor 22, which supplies pressurized hydraulic fluid to implement 10 based on the information.

Now looking at FIG. 2, there is illustrated a hydraulic load sensing system 24 where a transducer 26 senses a load by having pressurized fluid from multiple parts of planter 10 conveyed thereto, through valves 34. Illustrated here, there are seed drive motors 38, and fan motors 40 in two different sections and a bulk fill fan 46 located at another section of implement 10. These separate sections will have a load that requires a determinable amount of hydraulic fluid flow at a specific pressure to fulfil their individual load requirements. This load requirement is conveyed to transducer 26 by way of valves 34, which may be shuttle valves or other suitable valves that will allow the highest load need to be conveyed to transducer 26. Transducer 26 generates a signal representative of the load requirement and conveys the information by way of a communications means 36 represented here as a signal line 36, to tractor 22. The output of signal line 36 may be a synthesized hydraulic pressure that serves as the signal, particularly for the sake of compatibility with legacy tractor control systems.

In turn tractor 22 receives the signal from signal line 36 and uses that information to compensate the pressure and flow of the hydraulic fluid generated by a hydraulic pump coupled to an engine in tractor 22, to thereby produce adequate power to run implement 10. An advantage of the present invention is that the hydraulic needs of implement 10 can be met without the need to generate, by default, a constant higher pressure fluid supply. This reduces the energy losses that are experienced by less robust control systems.

Now, additionally looking at FIG. 3, there is illustrated a hydraulic load sensing system 124 that has many of the same elements as system 24. Here instead of having one transducer 26, there are three transducers 28, 30 and 32, each respectively assigned to one of the sections previously discussed. In this embodiment of the present invention, each transducer 28, 30 and 32 generates an individual signal, with them being electronically resolved to ultimately present one signal, by way of signal line 36, to tractor 22. The resolution of the signal is to present the highest result as the signal on signal line 36. Signal line 36 may be an electronic signal conveyed by a wire, a wireless electronic signal, or the signal may be presented in some other medium, such as a fluid or air. More specifically, the signal from the transducer(s) is converted into a current command to a duplicator valve 48 at the front of planter 10 or on tractor 22. The duplicator valve 48 uses supply oil from the power beyond line to create a duplicated hydraulic pressure signal the same as the highest load signal on the planter.

With the prior art the distance between the planter and the tractor is too long to provide a hydraulic hose between the load and the source to properly control a pressure compensated load sense system. In contrast the present invention uses pressure transducer(s) 26, 28, 30 and 32, depending upon the embodiment, to capture the highest load pressure, and convert that to an electronic signal that is sent to a valve either on the front of planter 10 or on tractor 22 which can convert/duplicate that hydraulic pressure into the hydraulic load sense signal circuit.

These long distances between a prior art planter and tractor 22 make it difficult to use a hydraulic hose to effectively communicate the load signals between the planter and tractor. This prevents the signal being used to control the tractor and therefore taking advantage of the efficiencies available from a pressure flow compensating (PFC) load sensing system.

In the present invention pressure transducer 26 or a group of pressure transducers 28, 30 and 32 are used by hydraulic load sensing system 24 or 124 at the toolbar of implement 10. Depending on the pressure transducer used, the system pressure can be resolved hydraulically thru a chain of load sense check valves 34 which communicate to one transducer 26, as in system 24 or a group of transducers 28, 30, 32 may be used, as in system 124, with the highest pressure signal is resolved electronically at the controller. The oil supplied to the transducer controlled circuits on implement 10 will come from the power beyond connection on tractor 22. The power beyond connections are a grouping of pump supply, return, and load sense signal inputs.

The pressure transducer (single or multiple arrangement) provides an electronic signal to the implement 10 controller 56. Controller 56 converts the signal into a current command to the duplicator valve 48 at the front of planter 10 or on tractor 22. The duplicator valve 48 uses supply oil from the power beyond line, or pump supply, to create a duplicated pressure signal the same as the highest load signal on the planter. The duplicated signal (if higher than the load sense signal circuit on the tractor) will communicate back to the PFC pump, thereby altering the hydraulic fluid pressure presented to implement 10.

Duplicator valve 48 may be located in a valve manifold 52 coupled to implement 10, or duplicate valve 48 may be located on tractor 22. Valve manifold 52 is used to control power beyond flow. When tractor 22 is running power beyond is always pressurized and is able to flow oil. A solenoid operated check valve in valve manifold 52 blocks flow from getting out to the planter and running continuously.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural system, comprising:
    a tractor; and
    an implement powered by said tractor, said implement including:
        a plurality of hydraulic fluid using devices;
        at least one transducer configured to obtain hydraulic load requirements of said plurality of hydraulic fluid using devices;
        a resolving means resolving a highest hydraulic load requirement from said load requirements;
        a generating means to generate a signal representative of said highest hydraulic load requirement of said plurality of hydraulic fluid using devices; and a communications means for conveying said signal to said tractor, said tractor being configured to alter a hydraulic fluid characteristic supplied to said implement dependent upon said signal.

2. The agricultural system of claim 1, further comprising a plurality of valves interconnecting at least two of said plurality of hydraulic fluid using devices, said at least one transducer being fluidly coupled between said plurality of valves, said plurality of valves being configured to convey a hydraulic pressure therethrough such that said at least one transducer is exposed to a higher of a fluid pressure from said at least two of said plurality of hydraulic fluid using devices.

3. The agricultural system of claim 1, wherein at least one of said plurality of hydraulic fluid using devices is a fan motor.

4. The agricultural system of claim 1, wherein at least one of said plurality of hydraulic fluid using devices is a seed drive motor.

5. The agricultural system of claim 1, wherein said implement is an agricultural planter.

6. The agricultural system of claim 1, wherein said at least one transducer is a plurality of transducers each associated with at least one of said plurality of hydraulic fluid using devices.

7. The agricultural system of claim 6, wherein said plurality of transducers are arranged such that said signal represents a highest of the hydraulic load requirement of said plurality of hydraulic fluid using devices.

8. The agricultural system of claim 1, wherein said signal is used by said tractor to alter a pressure of the hydraulic fluid supplied to said implement.

9. The agricultural system of claim 8, wherein said plurality of hydraulic fluid using devices includes a fan motor and a seed drive motor.

10. The agricultural system of claim 9, wherein said signal represents a higher of a hydraulic load requirement of said fan motor and a hydraulic load requirement of said seed drive motor.

11. An agricultural implement powered by a tractor, the implement comprising:
a plurality of hydraulic fluid using devices;
at least one transducer configured to obtain hydraulic load requirements of said plurality of hydraulic fluid using devices;
a resolving means resolving a highest hydraulic load requirement from said load requirements;
a generating means to generate a signal representative of said highest hydraulic load requirement of said plurality of hydraulic fluid using devices; and
a communications means for conveying said signal to the tractor, the tractor being configured to alter a hydraulic fluid characteristic supplied to the implement dependent upon said signal.

12. The agricultural implement of claim 11, further comprising a plurality of valves interconnecting at least two of said plurality of hydraulic fluid using devices, said at least one transducer being fluidly coupled between said plurality of valves, said plurality of valves being configured to convey a hydraulic pressure therethrough such that said at least one transducer is exposed to a higher of a fluid pressure from said at least two of said plurality of hydraulic fluid using devices.

13. The agricultural implement of claim 11, wherein at least one of said plurality of hydraulic fluid using devices is a fan motor.

14. The agricultural implement of claim 11, wherein at least one of said plurality of hydraulic fluid using devices is a seed drive motor.

15. The agricultural implement of claim 11, wherein said implement is an agricultural planter.

16. The agricultural implement of claim 11, wherein said at least one transducer is a plurality of transducers each associated with at least one of said plurality of hydraulic fluid using devices.

17. The agricultural implement of claim 16, wherein said plurality of transducers are arranged such that said signal represents a highest of the hydraulic load requirement of said plurality of hydraulic fluid using devices.

18. The agricultural implement of claim 11, wherein said signal is used by the tractor to alter a pressure of the hydraulic fluid supplied to said implement, thereby supplying said implement with hydraulic fluid at a pressure representative of said highest hydraulic load requirement.

19. The agricultural implement of claim 18, wherein said plurality of hydraulic fluid using devices includes a fan motor and a seed drive motor.

20. The agricultural implement of claim 19, wherein said signal represents a higher of a hydraulic load requirement of said fan motor and a hydraulic load requirement of said seed drive motor.

* * * * *